US008478588B2

(12) United States Patent
Da Palma et al.

(10) Patent No.: US 8,478,588 B2
(45) Date of Patent: Jul. 2, 2013

(54) RUN-TIME SIMULATION ENVIRONMENT FOR VOICEXML APPLICATIONS THAT SIMULATES AND AUTOMATES USER INTERACTION

(75) Inventors: William V. Da Palma, Coconut Creek, FL (US); Brett J. Gavagni, Coconut Creek, FL (US); Matthew W. Hartley, Boynton Beach, FL (US); Brien H. Muschett, Palm Beach Gardens, FL (US)

(73) Assignee: International Business Machines Corporation, Armonk, NY (US)

(*) Notice: Subject to any disclaimer, the term of this patent is extended or adjusted under 35 U.S.C. 154(b) by 2374 days.

(21) Appl. No.: 10/734,866

(22) Filed: Dec. 12, 2003

(65) Prior Publication Data
US 2005/0132261 A1 Jun. 16, 2005

(51) Int. Cl.
*G10L 15/00* (2006.01)
(52) U.S. Cl.
USPC .............. 704/231; 379/1.01; 379/265.05; 379/88.01; 379/88.11; 704/270.1; 704/275; 709/204; 709/217; 714/38; 717/127
(58) Field of Classification Search
USPC .......... 704/270.1, 275; 379/265.05, 1.01, 379/88.01, 88.11, 88.18; 709/204, 217; 714/38; 717/127
See application file for complete search history.

(56) References Cited

U.S. PATENT DOCUMENTS

| | | | | |
|---|---|---|---|---|
| 6,400,807 B1* | 6/2002 | Hewitt et al. | | 379/88.11 |
| 6,697,964 B1* | 2/2004 | Dodrill et al. | | 714/38.13 |
| 6,914,975 B2* | 7/2005 | Koehler et al. | | 379/265.05 |
| 7,231,636 B1* | 6/2007 | Evans | | 717/127 |
| 2002/0006186 A1* | 1/2002 | Sanders | | 379/1.01 |
| 2002/0076008 A1* | 6/2002 | Neary | | 379/88.01 |
| 2003/0139928 A1 | 7/2003 | Krupatkin et al. | | |
| 2003/0156706 A1* | 8/2003 | Koehler et al. | | 379/265.05 |
| 2003/0212561 A1* | 11/2003 | Williams et al. | | 704/270.1 |
| 2004/0019638 A1* | 1/2004 | Makagon et al. | | 709/204 |
| 2004/0078201 A1* | 4/2004 | Porter et al. | | 704/275 |
| 2004/0230434 A1* | 11/2004 | Galanes et al. | | 704/270.1 |
| 2005/0091059 A1* | 4/2005 | Lecoeuche | | 704/270.1 |
| 2006/0168095 A1* | 7/2006 | Sharma et al. | | 709/217 |
| 2006/0203980 A1* | 9/2006 | Starkie | | 379/88.18 |

OTHER PUBLICATIONS

Anonymous Author, *VoiceXML Test Suite Overview for VoiceXML Version 2.0*, 2002, pp. 1-10, CT Labs.
Rehor, Ken, et al., *VoiceXML Conformance Testing*, May 2003, pp. 1-2, vol. 3, Issue 3, VoiceXML Forum.

(Continued)

*Primary Examiner* — Michael Colucci
(74) *Attorney, Agent, or Firm* — Steven M. Greenberg, Esq.; Carey, Rodriguez, Greenberg & O'Keefe

(57) ABSTRACT

A method and system for testing voice applications, such as VoiceXML applications, is provided. The system provides a run-time simulation environment for voice applications that simulates and automates user interaction. A user simulation script is provided in a customized mark-up language. The voice application is processed to derive a nominal output of the voice application. The user simulation script is processed to generate a simulated output for the voice application corresponding to the nominal output. The user simulation script is also processed to generate a simulated input for the voice application corresponding to a pre-determined user input to the voice application. The simulated inputs and outputs are executed in conjunction with the voice application in real-time to test the application.

18 Claims, 2 Drawing Sheets

OTHER PUBLICATIONS

Rehor, Ken, et al., *VoiceXML Conformance Testing*, May 2003, pp. 1-3, vol. 3, Issue 3, VoiceXML Forum.

Rehor, Ken, et al., *VoiceXML Conformance Testing*, May 2003, pp. 1-4, vol. 3, Issue 3, VoiceXML Forum.

Anonymous Author, *Getting Started With Tellme Studio*, pp. 1-2, Tellme Networks, Inc.

Anonymous Author, *VoiceXML 2.0 Implementation Report*, Apr. 7, 2003, Appendix A, pp. 59-78, W3C®.

* cited by examiner

RUN-TIME SIMULATION ENVIRONMENT FOR VOICEXML APPLICATIONS THAT SIMULATES AND AUTOMATES USER INTERACTION

BACKGROUND OF THE INVENTION

1. Statement of the Technical Field

The present invention relates to the field of computer speech recognition, text-to-speech technology and telephony, and more particularly to a system and method for a run-time simulation environment for voice applications that simulates and automates user interaction.

2. Description of the Related Art

Functionally testing voice applications presents many difficulties. In the case of a VoiceXML (VXML) application, a VXML interpreter communicates with a platform that supplies the necessary speech technology needed to test the application in real-time. These speech technologies, such as an automatic speech recognition (ASR) engine, or a text-to-speech (TTS) engine or converter, are generally very CPU intensive and expensive to build and install. In addition to the speech technologies, to test a application a tester must also provided the input to the application. This usually requires a tester to physically perform the interaction, in the form of actual speech or key tone input, which may be cumbersome and difficult to provide. Having a person perform the input can be time consuming and costly.

Furthermore, when testing a voice application, it can be difficult to mimic the true behavior of speech or audio input to the application, as well as any text-to-speech or pre-recorded audio output from the application. This is because voice applications are used in a run-time environment, and are therefore very "time-oriented." A user is generally required to supply an input to the application within a certain amount of time or else a "speech timeout" may occur. In addition, it may be useful to ascertain the how long it may take for a typical user to navigate through a voice application so as to assess the behavior and efficacy of the application.

It would be desirable therefore to provide a testing environment that allows the simulation of user interaction as well as the simulation of the speech technology platform, such that a developer of voice applications will no longer be dependent on human testers and speech technology and hardware to test their applications. The testing environment would therefore be a "simulation environment" that would adequately replace the user and speech technologies. It would further be desirable to provide a simulation environment that simulated the actual execution time of a user interaction with the voice application, as if real input and output were occurring. A system and method is therefore needed to simulate that real-time execution.

SUMMARY OF THE INVENTION

The present invention addresses the deficiencies of the art in respect to testing voice applications and provides a novel and non-obvious method, system and apparatus for a run-time simulation environment for voice applications that simulates and automates user interaction.

Methods consistent with the present invention provide a method for simulating a run-time user interaction with a voice application. A user simulation script programmed to specify simulated voice interactions with the voice application is loaded. The voice application is first processed to derive a nominal output of the voice application. The user simulation script is second processed to generate both a simulated output for the voice application corresponding to the nominal output and a simulated input for the voice application corresponding to a pre-determined user input to the voice application.

Systems consistent with the present invention include a simulation tool for simulating a run-time user interaction with a voice application running on an application server. The tool is configured to load a user simulation script programmed to specify simulated voice interactions with the voice application. The tool is further configured to:

(i) process the voice application to derive a nominal output of the voice application; and (ii) process the user simulation script to generate a simulated output for the voice application corresponding to the nominal output, and to generate a simulated input for the voice application corresponding to a predetermined user input to the voice application.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

Figure 1:
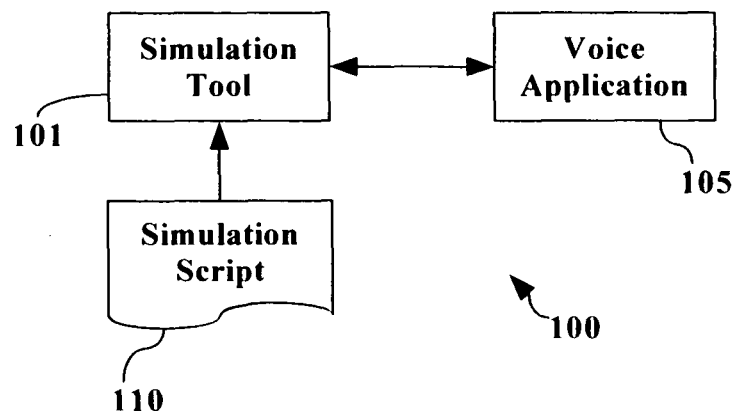
FIG. 1 is a conceptual drawing of the present invention which provides a user interaction simulation environment for a voice application.

The present invention is a system and method for simulating a run-time user interaction with a voice application. FIG. 1 is a conceptual drawing of the present invention which provides a user interaction simulation environment for a voice application. The simulation environment 100 of the present invention includes a simulation tool 101 that is coupled to a voice application 105. The simulation tool 101 uses a simulation script 110 that provides a set of specified inputs and outputs to and from the voice application, to simulate a real-time interaction by a user with the voice application. The simulation tool 101 and script 110 replace the actual inputs that may be provided by a live user, and replace the actual outputs that may be provided by the voice application 101 and all the speech technologies that are otherwise coupled to a conventional voice application. All interactions between the user and the voice application instead occur between the tool 101 and the application 105, where audible sound, keypad tones, pauses, hang-ups, and the like are instead represented by scripted text-equivalents that simulate both the content and execution time of such interactions.

As used herein, a "voice application" shall mean any logic permitting user interaction through a voice driven user interface, such as a mark-up language specification for voice interaction with some form of coupled computing logic. One example of a voice application is an application written in Voice Extensible Mark-up Language, or "VoiceXML." However, it is readily understood that VoiceXML applications are not the only type of voice applications, and any reference to the term "VoiceXML application" herein shall encompass all voice applications.

In conventional voice systems, the voice application itself receives the "outputs" it generates to users from various speech technologies coupled to the voice application. For example, the voice application can receive an input from the user, and can record the input with an audio device, or convert the spoken word input into text using an automatic speech recognition engine. The voice application can then playback the recorded audio to the user as a prompt, or may convert a text stream to audio using the text-to-speech capabilities of a speech technologies platform, either of which may be sent as another "output" to the user.

Heretofore, to test a voice application, all of the foregoing speech processing elements are needed. The present invention replaces a number of those elements, by providing a simulation environment that allows a voice application to be executed in real-time, and that supplies and simulates the execution time of the inputs and outputs that flow to and from the voice application. This provides for a realistic, cost-effective testing environment that will greatly increase the ease and efficacy of developing voice applications.

Figure 2:
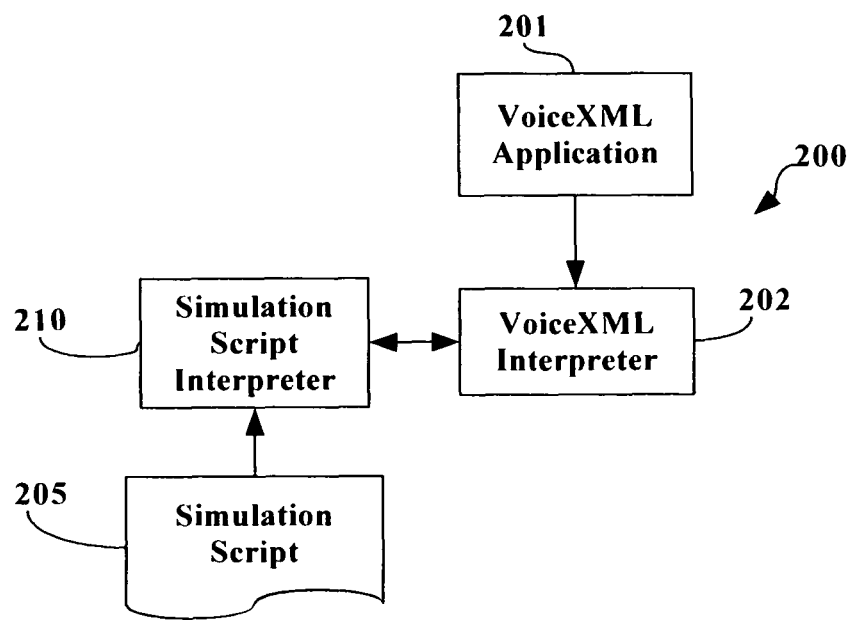
FIG. 2 is a block diagram showing the arrangement of elements in a system assembled in accordance with the principles of the present invention for simulating a run-time environment with a voice application.

FIG. 2 is a block diagram showing the arrangement of elements in a system 200 assembled in accordance with the principles of the present invention for simulating a run-time environment with a voice application. The system 200 includes a VoiceXML Application 201 (which may running on an application server) that can be interpreted by an interpreter 202. The system 200 also includes a simulation script 205 that can be interpreted by a second interpreter 210. The second interpreter 210 may reside on a separate piece of hardware, or may be resident on the same hardware as the voice application 201 and interpreter 202.

The simulation environment 200 can process customized mark-up language documents which describe the user interaction or the user experience with the environment itself. Specifically, the mark-up language documents describe the set of operations a user might take as a transcript of what occurs when interacting with the voice application. In this regard, what is the desired to be simulated is the behavior between the user and the voice application, which is provided by the simulation script 205 written in the customized mark-up language, which, by way of non-limiting example, may be called a "Voice User Interaction Extensible Mark-up Language," or "VuiXML." The user behavior, as well as the prompts and outputs supplied from the voice application itself, is mimicked and embodied in the user simulation script 205. The user simulation script 205 can be a script that describes how the user interacts with the system. Common interaction behaviors can include voice response, input in the form of digits, pauses between spoken words, hang-up operations, typical inputs that a user would make when interacting with a voice response system. This user interaction is embodied in the script 205.

In addition to the script 205, an interpreter 210 can be included. The interpreter 210 processes the simulation script 205 and interacts with the VoiceXML interpreter 202. The interaction between the script 205 and VoiceXML application 201 uses only text-based results, and dispenses with the need for actual human or machine-generated audio input or output. There is however, a pre-cognition of what the user is going to do, and thus, the script 205 can be pre-developed. But, the script 205 flows in real-time and describes what a user is doing sequentially, and supplies the outputs and prompts from a voice application in real-time, so as to better test and develop the application.

Figure 3:
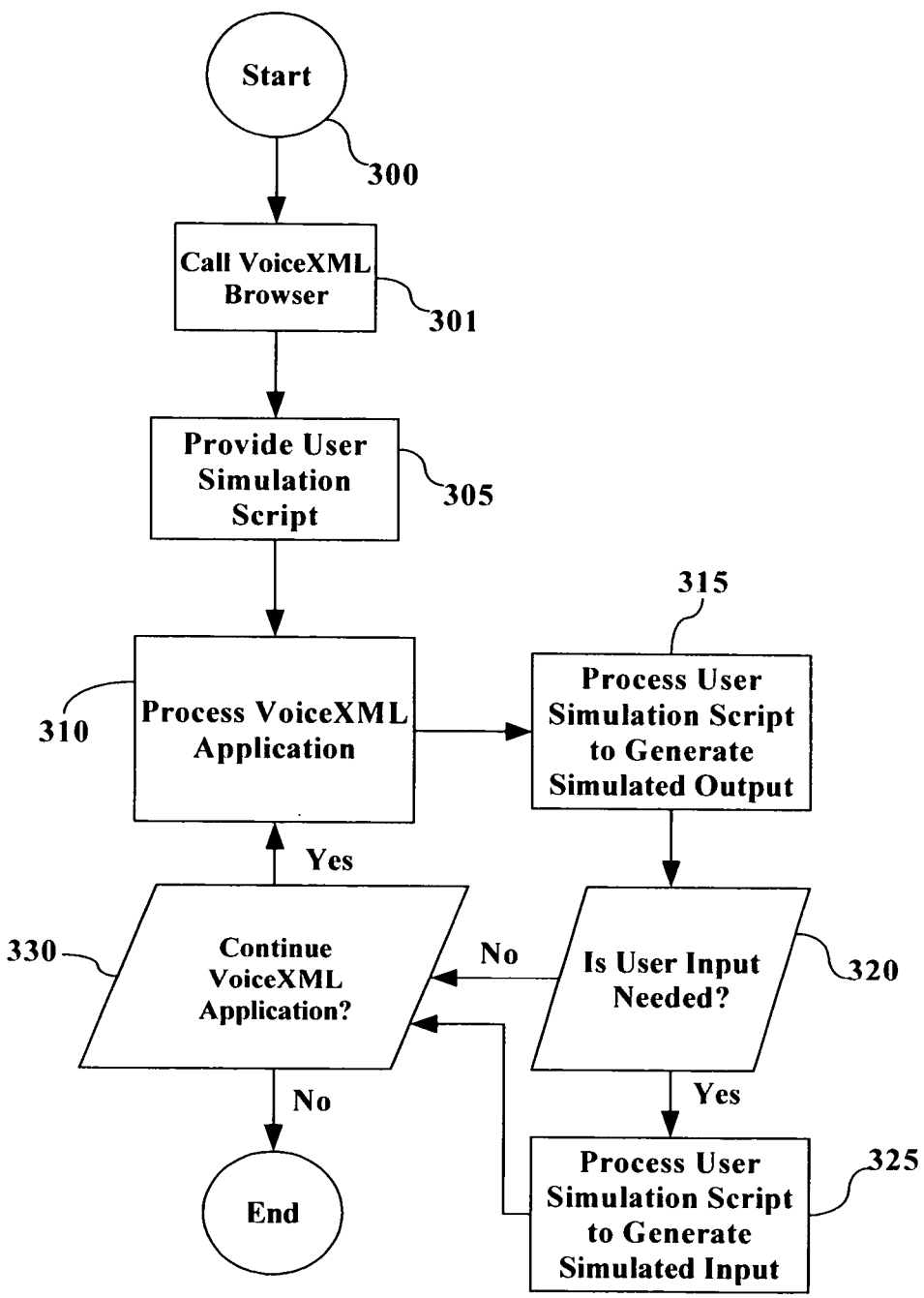
FIG. 3 is a flowchart illustrating a process for simulating a run-time user interaction with a voice application.

FIG. 3 is a flowchart illustrating a process for simulating a run-time user interaction with a voice application. First, the voice application browser, such a VoiceXML browser, is called in step 301. Next, in step 305, a user simulation script is provided and supplied to the simulation environment. Subsequently, the voice application is processed in step 310.

The voice application normally generates one or more outputs, which, in conventional systems, may be prompts, synthesized text to speech, pre-recorded audio, and the like. However, in the simulation environment of the present invention, all such outputs are text based, and are initially "nominal" outputs: the outputs that the voice application would otherwise provide to a user in the non-simulated environment. Within the simulation environment, the actual outputs for the voice application are instead generated by the user simulation script, which generates a simulated output for the voice application corresponding to the "nominal" output. This occurs in step 315.

In step 320, the process next determines whether the voice application requires a user input. Should the voice application require a user input, the user simulation script is processed in step 325 to generate a simulated input for the voice application corresponding to a pre-determined user input to the voice application. As stated above, all such input is pre-developed and supplied in the user simulation script. The process may then choose to continue after assessing whether additional processing of the voice application is necessary in step 330, or may terminate if execution of the voice application is complete.

The advantage and utility of the present invention is that the user simulation script generates simulated outputs and inputs in real-time, and not only provides the simulated text of the nominal outputs and user inputs to a voice application, but provides them at a time rate which closely mimics a run-time interaction. One example of a run-time user interaction is given below in Table 1, which simulates a user interaction with a voice application written for allowing a user to interact with a voice portal that provides banking services.

TABLE 1

| Event Sequence | Type of Input/ Output | Script | Replaces |
|---|---|---|---|
| 1: "Welcome to Bank, Enter PIN" | Nominal Output | VoiceXML | N.A. |
| 2: "Welcome to Bank, Enter PIN" | Simulated Output | Simulation | Audio |
| 3: "3497" | Pre-determined User Input | N.A. | N.A. |
| 4: "3497" | Simulated Input | Simulation | Telephony Subsystem |
| 5: "Say 'One' for Account . . ." | Nominal Output | VoiceXML | N.A. |
| 6: "Say 'One' for Account . . ." | Simulated Output | Simulation | TTS |
| 7: "One" | Pre-determined User Input | N.A. | N.A. |
| 8: "One" | Simulated Input | Simulation | ASR |

TABLE 1-continued

| Event Sequence | Type of Input/ Output | Script | Replaces |
|---|---|---|---|
| 9: "Your Account Balance is..." | Nominal Output | VoiceXML | N.A. |
| 10: "Your Account Balance is..." | Simulated Output | Simulation | TTS |

A sequence of nominal and simulated events in the run-time simulation environment of the present invention is shown in Table 1. The sequence begins by processing the voice application, which in this case is a VoiceXML application, to derive a nominal output from the application, which would prompt a user to enter a PIN code. The script providing this nominal output is the VoiceXML application itself. This is indicated in the "Script" column of Table 1. To simulate the time it would take an application server to execute such a nominal output in real-time, the user simulation script is processed to generate a simulated output, which has the same text corresponding to the nominal output at event 1 in the sequence of Table 1. The simulated output is run at a rate that simulates the length of time a system would take to execute that output. This output is generated by the simulation script, and not the voice application script. The simulation script therefore replaces the pre-recorded or synthesized audio device that would otherwise be supplied through the VoiceXML script to prompt the user. This is indicated in the "Replaces" column of Table 1.

A similar pair of nominal input/outputs and simulated input/outputs are provided in events 3 through 10 of the sequence of Table 1. In event 4, the simulation script provides a simulated input corresponding to the pre-determined user input in the form of digits that replace the input that would have otherwise been supplied through a software-telephony sub-system in a conventional testing environment. Next, the simulation script simulates a VoiceXML prompt for an account code number, by replacing the TTS engine that would otherwise be used to supply the prompt. Another predetermined user input is provided in event 8 as a simulation of the ASR engine, which would otherwise recognize a user's nominal input of the spoken word "One" at event 7. The final simulation would be of another text-to-speech-synthesized nominal output that is simulated by an additional processing of the user simulation script to provide a text equivalent in real-time of the message "Your account balance is ...".

As shown in Table 1, the entire user interaction with the VoiceXML application is simulated by the simulation script running in real-time with the voice application. As shown in FIG. 2, a simulation script interpreter 210 interpreting the customized mark-up language of the script 205 is coupled to a voice application interpreter 202 interpreting the VoiceXML application. In events 2, 6, and 10 of Table 1, the simulation script provides a simulated output that simulates a text equivalent and an execution time for the nominal outputs in events 1, 5, and 9, respectively. And in events 4 and 8 of Table 1, the simulation script provides a simulated input that simulates a text equivalent and an execution time for the pre-determined user inputs in events 3 and 7, respectively. The present invention thereby allows a developer of a voice application to test the application by simulating the real-time flow of events between a user and a voice application. The simulated inputs and outputs are executed in conjunction with the voice application in real-time to test the application. This greatly aids in developing the voice application.

Another advantage of the present invention is that, in a simulation environment, the system should be vendor-agnostic, in that the system should not have to handle the various behaviors of different speech technology platforms. The environment should instead be focused on simulating the voice application itself. Thus, the system 200 dispenses with the need for the speech technologies and its attendant devices, as well as for any network and telephony sub-system. The present invention therefore provides a robust simulation environment that does not depend on the various components generally used to implement and execute a voice application.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A computer-implemented method for simulating a run-time user interaction with a voice application, said method comprising the steps of:
   providing a simulation environment including a simulation tool coupled to a voice application;
   loading a user simulation script to the simulation tool;
   processing the user simulation script by the simulation tool to generate both a simulated input to the voice application and a simulated output from the voice application;
   wherein the simulation tool and user simulation script replace actual inputs provided by a live user, actual outputs provided by the voice application and all speech technologies needed when the voice application is not in the simulation environment, and wherein all actual interactions between the user and the voice application are represented by scripted text-equivalents that simulate both the content and execution time of such interactions.

2. The method of claim 1, wherein the user simulation script is specified in a customized mark-up language.

3. The method of claim 1, wherein the step of processing further comprises simulating a text equivalent and an execution time for each nominal output and pre-determined user input.

4. The method of claim 1, wherein the simulated output simulates an output from a text to speech engine in response to the simulated input.

5. The method of claim 1, wherein the simulated output simulates an output from an automatic speech recognition engine in response to the simulated input.

6. The method of claim 1, wherein the simulated output simulates a pre-recorded audio source.

7. A computer-readable storage medium having stored thereon a computer program for simulating a run-time user interaction with a voice application, said computer program comprising a routine set of instructions which when executed by a computer cause the computer to perform the steps of:

providing a simulation environment including a simulation tool coupled to a voice application;

loading a user simulation script to the simulation tool;

processing the user simulation script by the simulation tool to generate both a simulated input to the voice application and a simulated output from the voice application;

wherein the simulation tool and user simulation script replace actual inputs provided by a live user, actual outputs provided by the voice application and all speech technologies needed when the voice application is not in the simulation environment, and wherein all actual interactions between the user and the voice application are represented by scripted text-equivalents that simulate both the content and execution time of such interactions.

8. The computer-readable medium of claim 7, wherein the user simulation script is specified in a customized mark-up language.

9. The computer-readable medium of claim 7, wherein the step of processing comprises simulating a text equivalent and an execution time for each nominal output and pre-determined user input.

10. The computer-readable medium of claim 7, wherein the simulated output simulates an output from a text to speech engine in response to the simulated input.

11. The computer-readable medium of claim 7, wherein the simulated output simulates an output from an automatic speech recognition engine in response to the simulated input.

12. The computer-readable medium of claim 7, wherein the simulated output simulates a pre-recorded audio source.

13. A computer-implemented simulation tool system for simulating a run-time user interaction with a voice application running on an application server, said tool system comprising a processor configured to:

load a user simulation script; and processing the user simulation script to generate both a simulated input to the voice application and a simulated output from the voice application;

wherein the simulation tool and user simulation script replace actual inputs provided by a live user, actual outputs provided by the voice application and all speech technologies needed when the voice application is not in the simulation environment, and wherein all actual interactions between the user and the voice application are represented by scripted text-equivalents that simulate both the content and execution time of such interactions.

14. The computer-implemented simulation tool system of claim 13, wherein the user simulation script is specified in a customized mark-up language.

15. The computer-implemented simulation tool system of claim 13, wherein the simulated output simulates a text equivalent and an execution time for a nominal output; and wherein the simulated input simulates a text equivalent and an execution time for a pre-determined user input.

16. The computer-implemented simulation tool system of claim 13, wherein the simulated output simulates an output from a text to speech engine in response to the simulated input.

17. The computer-implemented simulation tool system of claim 13, wherein the simulated output simulates an output from an automatic speech recognition engine in response to the simulated input.

18. The computer-implemented simulation tool system of claim 13, wherein the simulated output simulates a pre-recorded audio source.

* * * * *